(12) United States Patent
Amagai et al.

(10) Patent No.: US 11,895,939 B2
(45) Date of Patent: Feb. 13, 2024

(54) COHORT PHENOTYPING SYSTEM FOR PLANT FACTORY WITH ARTIFICIAL LIGHTING

(71) Applicants: NATIONAL UNIVERSITY CORPORATION CHIBA UNIVERSITY, Chiba (JP); NON PROFIT ORGANIZATION JAPAN PLANT FACTORY ASSOCIATION, Kashiwa (JP)

(72) Inventors: Yumiko Amagai, Kashiwa (JP); Alexander Feldman, Kashiwa (JP); Yu Zhang, Kashiwa (JP); Tomomi Nozaki, Kashiwa (JP); Toyoki Kozai, Kashiwa (JP); Eri Hayashi, Kashiwa (JP); Osamu Nunomura, Kashiwa (JP); Rikuo Hasegawa, Kashiwa (JP)

(73) Assignees: NATIONAL UNIVERSITY CORPORATION CHIBA UNIVERSITY, Chiba (JP); NON PROFIT ORGANIZATION JAPAN PLANT FACTORY ASSOCIATION, Chiba (JP)

( * ) Notice: Subject to any disclaimer, the term of this patent is extended or adjusted under 35 U.S.C. 154(b) by 369 days.

(21) Appl. No.: 17/430,717

(22) PCT Filed: Feb. 13, 2020

(86) PCT No.: PCT/JP2020/005589
§ 371 (c)(1),
(2) Date: Aug. 12, 2021

(87) PCT Pub. No.: WO2020/170939
PCT Pub. Date: Aug. 27, 2020

(65) Prior Publication Data
US 2022/0142038 A1  May 12, 2022

(30) Foreign Application Priority Data

Feb. 19, 2019 (JP) ................. 2019-027079

(51) Int. Cl.
*A01G 7/04* (2006.01)
*A01C 1/02* (2006.01)
*G06T 7/00* (2017.01)

(52) U.S. Cl.
CPC ............... *A01C 1/02* (2013.01); *A01G 7/045* (2013.01); *G06T 7/0004* (2013.01);
(Continued)

(58) Field of Classification Search
CPC .. A01C 1/02; A01G 7/045; A01G 9/24; G06T 7/0004; G06T 2207/10024;
(Continued)

(56) References Cited

U.S. PATENT DOCUMENTS 6,653,527 B1 * 11/2003 Deng ................... C07K 14/415
800/290
7,081,363 B2 * 7/2006 Deng ................. C12N 15/8267
536/23.6
(Continued)

FOREIGN PATENT DOCUMENTS

JP   H01-262712 A   10/1989
JP   H02-72802 A    3/1990
(Continued)

OTHER PUBLICATIONS

Pct, International Search Report for the corresponding application No. PCT/JP2020/005589, dated May 26, 2020, with English translation.

(Continued)

*Primary Examiner* — Ali Bayat
(74) *Attorney, Agent, or Firm* — LUCAS & MERCANTI, LLP

(57) ABSTRACT

The invention tracks and automatically evaluates plant traits of "individuals of plant canopy" in a growth process of a germination period (from sowing until immediately prior to primary seedling culture), at a plant factory with artificial lighting. Specifically, a two-dimensional distribution of the plant traits is calculated by non-destructively and continu- (Continued)

ously measuring plant trait information in the growth process of the germination period, on the basis of image information $2a$, environmental factor information $2b$, genetic characteristic information $2c$, and management information $2d$. In addition, physiological performance reactions of the individuals of plant canopy cultivated in an environmentally-controlled closed space are continuously measured, and measurements are continuously taken of the two-dimensional distribution of the environmental factor information, and items such as temperature, vapor pressure deficit, nutrient solution percentage, nutrient solution temperature, pH, and electric conductivity.

7 Claims, 10 Drawing Sheets

(52) U.S. Cl.
CPC ........... *G06T 2207/10024* (2013.01); *G06T 2207/10048* (2013.01); *G06T 2207/30188* (2013.01)

(58) Field of Classification Search
CPC ........... G06T 2207/10048; G06T 2207/30188; Y02A 40/25
USPC .......................................................... 382/141
See application file for complete search history.

(56) References Cited

U.S. PATENT DOCUMENTS

| | | | |
|---|---|---|---|
| 2011/0167721 A1* | 7/2011 | Lejeune | A01H 1/04 |
| | | | 382/110 |
| 2014/0376239 A1 | 12/2014 | Kim et al. | |
| 2015/0037923 A1 | 2/2015 | Tarasov et al. | |
| 2015/0223419 A1* | 8/2015 | Lejeune | B65G 15/14 |
| | | | 700/218 |
| 2020/0392527 A1* | 12/2020 | Settles | C12N 15/82 |
| 2021/0180074 A1* | 6/2021 | Chen | C07K 14/415 |

FOREIGN PATENT DOCUMENTS

| | | |
|---|---|---|
| JP | 2005-229818 A | 9/2005 |
| JP | 2016-208853 A | 12/2016 |
| JP | 6144290 B2 | 6/2017 |

OTHER PUBLICATIONS

"Aguribaio," Japanese Journal of Agricultural Biotechnology, Mar. 20, 2018, pp. 281-261, vol. 2, No. 3, Hokuryukan Co., Ltd., Japan (with English translation).

* cited by examiner (a)

(b)

(a)

(b)

(a)

csv file (320 × 240pixcel)

(b)

Temperature data of the seed location (300 points)

(a) Seed type : uncoated seed (b) Seed type : coated seed

COHORT PHENOTYPING SYSTEM FOR PLANT FACTORY WITH ARTIFICIAL LIGHTING

CROSS REFERENCE TO RELATED APPLICATION

This Application is a 371 of PCT/JP2020/005589 filed on Feb. 13, 2020, which claims priority of Japanese patent application no. 2019-027079 filed on Feb. 19, 2019, and the above applications are incorporated herein by reference.

TECHNICAL FIELD

The invention relates to a seed cohort phenotyping system for a plant factory with artificial lighting where agrochemical-free and clean plants are produced according to annual plan by integrating a seed phenotyping method into the plant factory with artificial lighting.

BACKGROUND ART

From the past, the conventional plant factories with artificial lighting can produce a required amount of agrochemical-free and clean plants (typically vegetables, hereinafter also referred to as vegetables) regardless of seasons in a planned way by controlling environments such as light, air and temperature with the cultivation modules provided in a closed space. Namely, from the plant factories with artificial lighting, thousands to tens of thousands plants of vegetables per day can be supplied to the consumers through a series of the processes including sowing to germination, seedling, transplanting, cultivation, trimming of the harvested plants, packaging and shipment.

Generally, the phenotype (plant traits) is often measured and assessed during the growth and cultivation of plant in the production process. This practice is named phenotyping. The conventional phenotyping is almost performed by picking, destructing the plant (samples) and measuring and evaluating the phenotype. The measurement and the evaluation of the phenotype with the destruction requires time and labor.

As a countermeasure, recently the technique for evaluating the plant traits non-destructively and automatically is being developed which employs a drone and a large gantry crane for a specific "plant canopy" for the plants growing at the outdoor places such as farm fields, paddy fields and forests, and employs more than one image sensors such as single lens reflex camera for "individuals of plant canopy" for the plants cultivated indoor (Non-patent Literature 1).

Moreover, a bean sprouts hydroponic system which improves the productivity by measuring the concentrations of oxygen and carbon dioxide and the temperature in the cultivation chamber to control irrigation is proposed (Patent Literature 1). Also, a bean sprouts hydroponic system which measures the height, the weight, and the like of the plant to control the artificial light (LED) is proposed (Patent Literature 2).

In addition, the plant growth analysis system which observes and analyzes the changes of states (traits) such as a morphology and a color of the plant in the growth process is proposed (Patent Literature 3).

CITATION LIST

Patent Literature

Patent Literature 1: JP 6,144,290 B
Patent Literature 2: US 2014/0376239 A1
Patent Literature 3: JP 2005-229818 A

Non-Patent Literature

Non-Patent Literature 1: "AGURIBAIO" March 2018 issue (Japanese Journal of agricultural biotechnology issued by Hokuryukan co., ltd. Mar. 20, 2018), pp. 218-261.

SUMMARY OF INVENTION

Technical Problem

A plant responds to the environments to change the morphology of plant (or plant traits) with time. In the past, there were no example of a system tracking and automatically evaluating the plant traits of "individuals of plant canopy" in the growth process in parallel with the production process.

The three main factors affecting the dispersion of the time from the sowing to the germination, the germination rate, and the uniformity of the growth after germination are (1) the genetic traits and the quality of the seeds, (2) the cultivation environments, and (3) the variation of the management of the sowing, the cultivating and the breeding. These factors enlarge the differences between the grown plants at the harvesting stage alone or by multiply affecting each other. However, the knowledges about the effects of these factors on the plant growth have not been arranged systematically yet, therefore prompt arrangements are desired.

When the conventional phenotyping method is used, enlargement of the apparatus and more than one device such as expensive cameras are needed. At the plant factory with artificial lighting, large apparatus cannot be installed, and the lighting and the air conditioning system not required for the open cultivation (outdoor cultivation) need to be set up, which would result in the increasing of the cost.

The objects of the invention are to solve the above problems of the conventional technique and to provide a system tracking and automatically evaluating the plant traits in the plant factory with artificial lighting.

Solution to Problem

The inventions make it possible to conduct the factor-control study, what is called "seed cohort research" which tracks the traits of "individuals of plant canopy" and collects the trait data in the growth process during the narrow period from sowing to immediately prior to primary raising of seedling (equal to the period of the germination) in the plant factory with artificial lighting.

The seed cohort phenotyping system for plant factory with artificial lighting of the invention is characterized by the technical features described below. Note that the codes of the main components in the drawings corresponding to the Examples are added to clear the technical features of the invention.

[1] The system of the invention comprises integrated control part 30 comprising operation and control part 1, data set input part 2, data storage 3, machine learning part 4, image processing part 5, statistical data analyzing part 6, association/causal relation derivation calculation part 7, and verification part 8.

Integrated control part 30 provides a two-dimensional distribution of the plant traits by non-destructively and continuously measuring plant trait information in a growth process during a germination period (from sowing to immediately prior to primary seedling culture), on the basis of image information 2a, environmental factor information 2b, genetic characteristic information 2c and management information 2d inputted from data set input part 2 and stored in data storage 3, wherein physiological performance reactions of the seeds sowed in an environmentally-controlled closed space during the germination period are continuously measured, and a two-dimensional distribution of the environmental factor information, a nutrient solution temperature, a temperature, a vapor pressure deficit (difference between the amount of saturated water vapor and absolute humidity), a nutrient solution percentage, a pH and an electric conductivity are continuously measured.

[2] The two-dimensional distribution is provided by incorporating morphology, size, color, temperature of seeds, timing of germination (the time from the sowing to the germination), surface temperature of medium, and elongating rate of radicles as image information with RGB image information acquisition means 24 and IR image information acquisition means 25.

[3] The physiological performance reactions comprise a water or nutrient solution uptake rate (speed) when the seeds start to grow on growing point from dormant in a state that the seeds are swollen, a nutrient solution content to the size of the seeds (the content rate of the nutrient solution in the seed), and an oxygen concentration necessary for the germination.

[4] The environmental factor information includes, a temperature, a vapor pressure deficit, nutrient solution percentage, which means a nutrient solution percentage in a volume base obtained by dividing a volume of pouring nutrient solution V2 ($cm^3$) by a volume of the sowing mat V1 ($cm^3$), a nutrient solution temperature, a pH, and an electric conductivity.

[5] The genetic characteristic information comprises homology information between genome information obtained from genome DNA and RNA extracted from grown plant bodies by various genetic engineering experiments and genome information obtained from known genome information database.

[6] The management information includes a sower, a time required for sowing, locations of seeds in a sowing box in a germination section (the germination apparatus controlling and maintaining temperature, humidity and dark conditions from sowing until prior to primary seedling culture), and a measurement error.

Note that the invention is not limited to the above technical features and the components of the Examples described below. The various modifications are possible within the range of the technical idea of the invention.

Effects of the Invention

The invention can reduce the labor and the working time for the automation of the production in the large-scale plant factory required in the future and the automation of the seed selection and the operation of the cultivation at a seed production company, etc., to about one-tenth or less of the conventional labor and the conventional working time.

By using the data accumulated in data storage 3, the knowledges about the morphology, the size, the color and the temperature of the seeds, the time from the sowing to the germination, the elongating rate of the radicles, and the effects on the plant growth can be deepened, furthermore, the germination rate can be improved from about 80% under the normal situation to 99.9% or more.

The data about the plant traits can be collected with the inexpensive small electronic devices, which are able to be obtained by (A) non-destructively and continuously measuring the plant traits in the growth process during the germination period and identifying the two-dimensional distribution of the plant traits, (B) continuously measuring the physiological performance reactions of the individuals of plant canopy cultivated in the environmentally-controlled closed space and (C) continuously measuring the two-dimensional distribution of the environmental factor information, the nutrient solution temperature, the pH and the electric conductivity, etc.

Also, according to the invention, tracking and automatic evaluation of the plant traits in the growth process during the germination period in the plant factory with artificial lighting allows to conduct the automatic phenotyping of the plant individuals non-destructively and continuously at a whole to produce the uniform seedlings.

FORM TO CARRY OUT INVENTION

The invention is described below by referencing to the drawings of the Examples.

Figure 1:
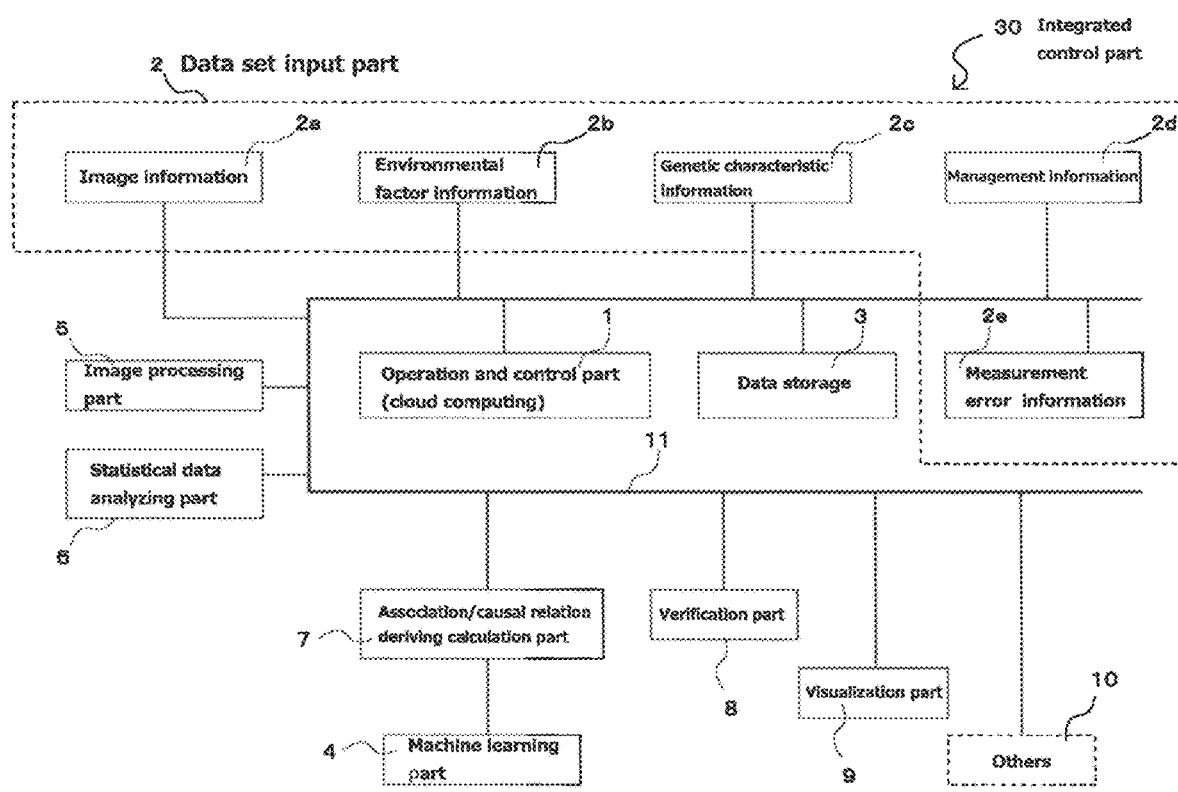
FIG. 1 shows a functional block diagram of an Example of the seed cohort phenotyping system for the plant factory with artificial lighting of the invention.

FIG. 1 is a functional block diagram of one of the Examples of the seed cohort phenotyping system for the plant factory with artificial lighting of the invention. Code 1 indicates the operation and control part which is comprised of what is called a cloud computing system. Operation and control part 1 is connected to data set input part 2, data storage 3, machine learning part 4, image processing part 5, statistical data analyzing part 6, association/causal relation derivation calculation part 7 and verification part 8 through data path 11. Operation and control part 1 is connected to visualization part 9 including a display device such as an image monitor and a peripheral device including a communication controller and input/output means such as a keyboard, a printer, etc., showed as others 10.

Data set input part 2 has input parts for environmental factor information 2b, genetic characteristic information 2c and management information 2d. The initial values corresponding to that information are inputted. The initial values inputted are stored in data storage 3.

The two-dimensional distribution of the plant traits is obtained by calculating the contribution of the distribution of genetic characteristic information 2c, management information 2d and measurement error 2e to the two-dimensional distribution of the plant traits based on the conditions that the two-dimensional distribution of the plant traits is expressed as the results of the distribution of environmental factor information 2b, genetic characteristic information 2c, management information 2d and measurement error 2e.

The two-dimensional distribution of the plant traits arranged in time series is stored in data storage 3 as a data set of the contribution of the distribution of genetic characteristic information 2c, management information 2d and measurement error 2e to the two-dimensional distribution of the plant traits calculated based on the conditions that the two-dimensional distribution of the plant traits is expressed as the results of the distribution of environmental factor information 2b, genetic characteristic information 2c, management information 2d and measurement error 2e.

The association of the two-dimensional distribution of the plant traits, environmental factor information 2b, genetic characteristic information 2c, management information 2d, and measurement error 2e as well as the contribution to the distribution of environmental factor information 2b, genetic characteristic information 2c, management information 2d and measurement error 2e are calculated by association/causal relation derivation calculation part 7 by using machine learning part (deep learning part) 4.

The mass and energy balance, the plant growth, the multivariate analysis and the model for the behavior or surrogate are also used for the above calculation of the association of the two-dimensional distribution of the plant traits, environmental factor information 2b, genetic characteristic information 2c, management information 2d and measurement error and the contribution to the distribution of environmental factor information 2b, genetic characteristic information 2c, management information 2d and measurement error 2e.

Figure 2:
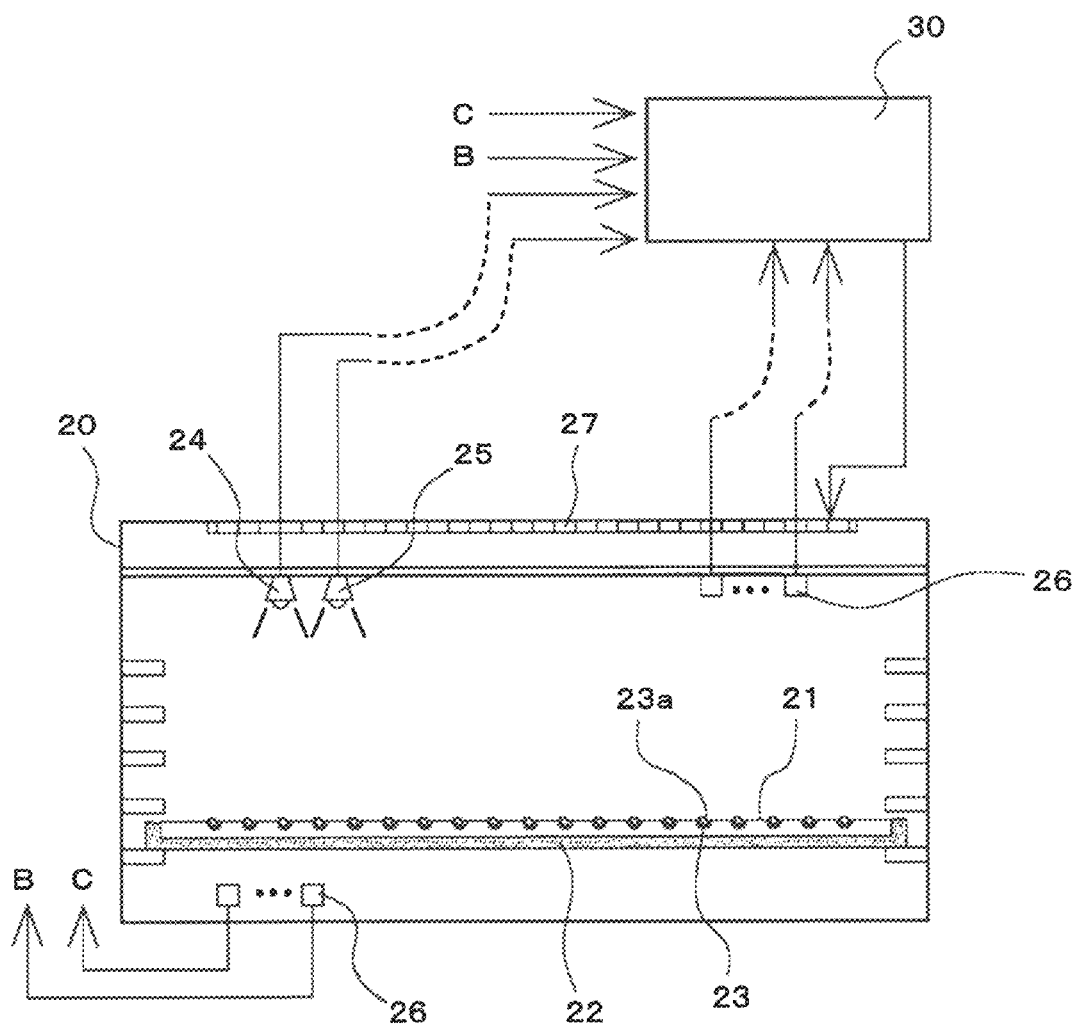
FIG. 2 shows a schematic diagram of the germination section where the seed cohort phenotyping system of the invention is used in the plant factory with artificial lighting.

FIG. 2 is a schematic diagram of the germination section where the seed cohort phenotyping system for the plant factory with artificial lighting of the invention is used, which is called seed phenotyping unit. In FIG. 2, code 20 is a housing of the germination section in which sowing mat 21 made of urethane foam (medium, simply urethane hereinafter) is placed. Sowing mat 21 includes more than one seed hole 23 (concavity) formed in the desired density. Seeds 23a are sowed in seed holes 23. Sowing mat 21 is uniformly soaked in the nutrient solution filled in sowing box (made of styrene foam) 22. Note that additional devices for controlling the nutrient solution temperature, measuring the oxygen concentration and the water content of the seeds, etc., are omitted in FIG. 2.

Inside housing 20 of the germination section, two imaging devices (camera) are established above sowing mat 21 and arranged so that images of seeds 23a sowed on sowing mat 21 are captured. One of the cameras is RGB camera 24 and the other is IR (infrared ray) camera 25.

RGB camera 24 captures the two-dimensional color image data and outputs the colored light data and the light intensity data of the two-dimensional plane of sowing mat 21 into integrated control part 30 including operation and control part 1 as a core.

IR camera 25 is a spectroscopic camera for the infrared region and is used as a thermal imaging camera. The calibration is made by using a thermocouple in advance and the reflectance of sowing mat (medium) is recognized in consideration of the color and the material. The temperatures of the seeds and the surface of the sowing mat (medium) are obtained. In the Example, which is a simple version, RGB camera 24 and IR camera 25 are used, but the use of the other camera having the similar functions is not excluded.

Moreover, because the CMOS sensor capable of electrically changing the sensitivity for the near infrared region in the same pixel is produced, the camera using the image sensor can be employed instead of the above two cameras.

Inside housing 20 of the germination section, the various sensors 26 detecting the temperature inside the housing and the water content of the seed, etc., are placed. The data outputted from RGB camera 24, IR camera 25 and various sensors 26 are transferred to integrated control part 30 including operation and control part 1 and equipped with the calculation and measurement evaluation means as image information 2a in FIG. 1.

Note that integrated control part 30 includes control means essential for the plant factory such as a control part for artificial lighting module (LED panel) 27 set inside housing 20 and an air-conditioning control part set inside housing 20 of the germination section, etc.

Figure 3:
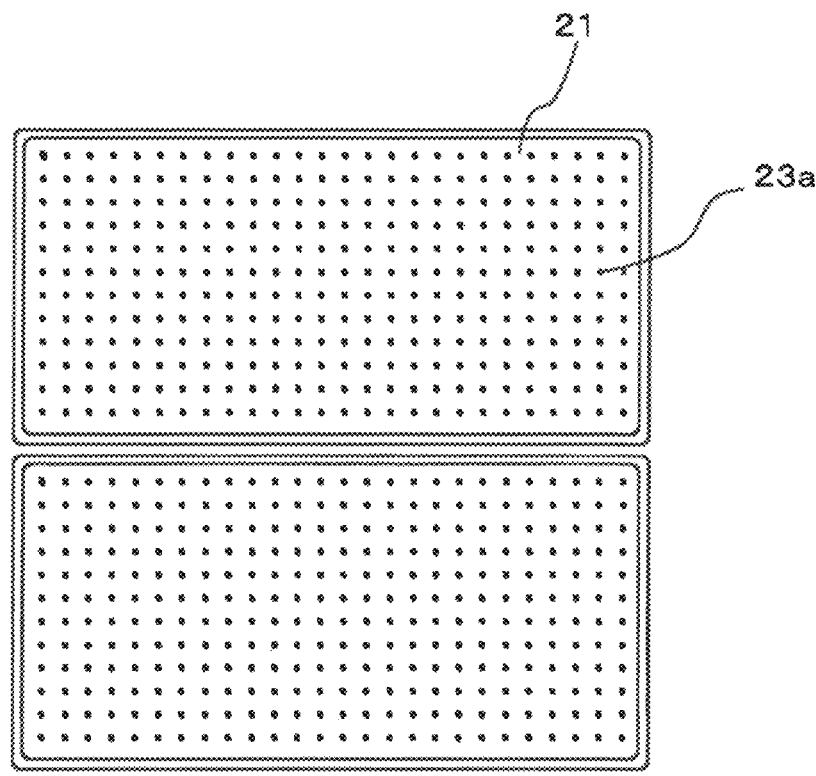
FIG. 3 shows a plane of the example of the sowing mat (medium) used in FIG. 2.
Figure 3:
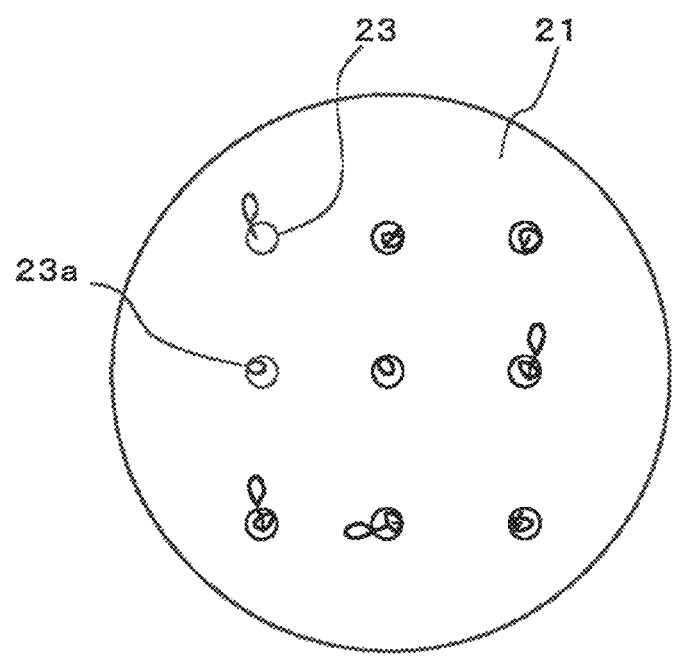

FIG. 3 shows a plane of the example of the sowing mat (medium) used in the FIG. 2. Figure (a) in FIG. 3 is a plan of whole sowing mat 21. Figure (b) in FIG. 3 is a plan obtained by magnifying the part of Figure (a) in FIG. 3 including 3×3 seed hole 23.

Sowing mat 21 is a medium for the germination of seed 23a. While the conditions such as the kinds of the mat, the nutrient solution percentage and the temperatures of the housing inside and the nutrient solution are changed, the seeds are germinated and cultivated. During the growth process, images are captured at the fixed intervals in a time series by using RGB camera 24 and IR camera 25 and stored as image information 2a in data storage 3 in FIG. 1. The image information 2a is transferred to integrated control part 30 including operation and control part 1 and equipped with calculation and measurement evaluation means and processed in image processing part 5. The results are also stored in data storage part 3.

Figure 4:
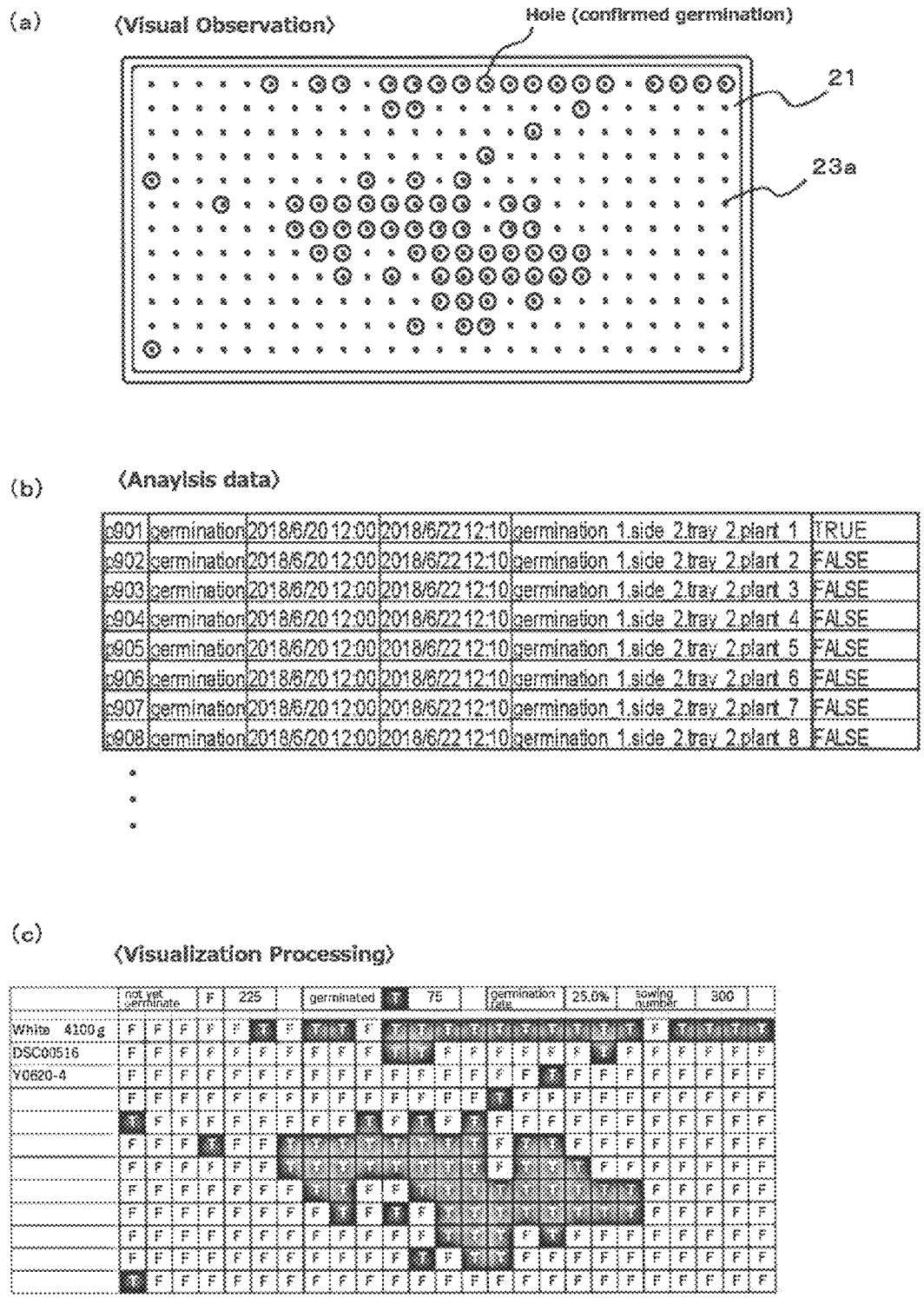
FIG. 4 shows image analyzing of the state of the seeds sowed in the holes of the sowing mat in the germination section.

FIG. 4 shows image analyzing of the state of the seeds sowed in the holes of the sowing mat in the germination section. Figure (a) in FIG. 4 is the states that seeds 23a germinate in sowing mat 21 observed by visual observation. The holes in which the germination is confirmed are circled so as to be easily understood.

Association/causal relation derivation calculation part 7 conducts the confirmation and the evaluation of the germination of the seeds on the base of the image captured by RGB camera 24 under the control of operation and control part 1 by using machine learning part 4.

The image of sowing mat 21 captured by RGB camera 24 is recorded as image information 2a in data storage 3. Image information 2a is analytically divided into hole 23 in which the seed germinates and hole 23 in which the seed do not germinate. As shown in FIG. 4 (b) the hole in which the seed germinates is recorded as "TRUE" and the hole in which the seed do not germinate are recorded as "FALSE" in the database.

Figure 10:
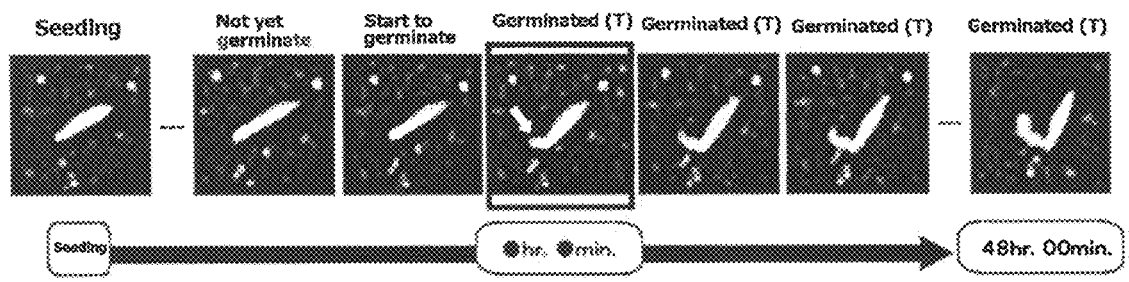
FIG. 10 shows one example of the images of the germination state of the seeds sowed on the sowing mat which are the data captured by an RGB camera.
Figure 10:
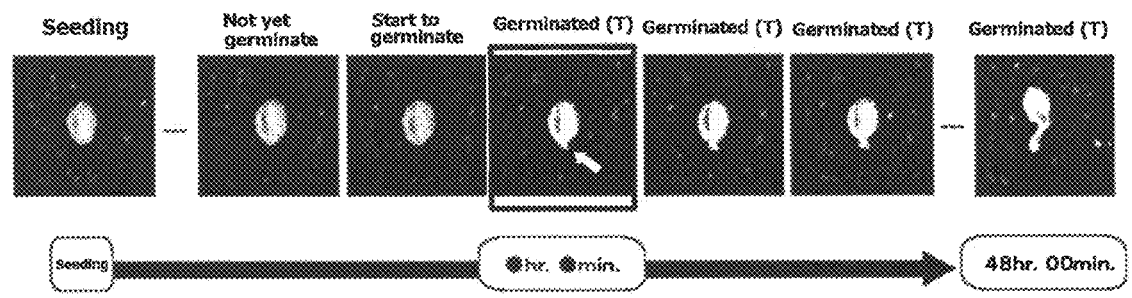

FIG. 10 shows one example of the images of the germination state of the seeds sowed on the sowing mat which are the data captured by an RGB camera.

The images of the state of seeds 23a sowed on sowing mat 21 are captured by RGB camera 24. The RGB image captured is processed as shown in the data acquiring images in FIG. 10 and recorded as the time series images of the seeds captured continuously. In FIG. 10, the images are recorded in a time series from the sowing to 48 hours after the sowing. FIG. 10(a) is an example of a case where the seed is a non-coated seed, and FIG. 10(b) is an example of a case where the seed is a coated seed. Regarding the growth process of every individual, the time series images are analyzed to acquire the germination data. The information obtained from analysis is recorded in the database, and then each image of the data is automatically tagged as "not yet germinate (F)", "start to germinate (T)" and "germinated (T)".

On sowing mat 21 exhibited on the screen of the display means (display and the like) as shown in FIG. 4 (c), the tags automatically attached thereto are processed to be easily visible, for example, "F" is shown in the location of seed hole 23 in which the seed is determined as "not yet germinate" and "T" is shown in the location of seed hole 23 in which the seed is determined as "start to germinate" and "germinated".

Thus, the two-dimensional distribution of the plant traits is obtained by calculation, and the information calculated is recorded in the data storage, after the consistency between the information calculated and the information about germination accurately evaluated by the visual observation shown in FIG. 4(a) is evaluated.

Figure 5:
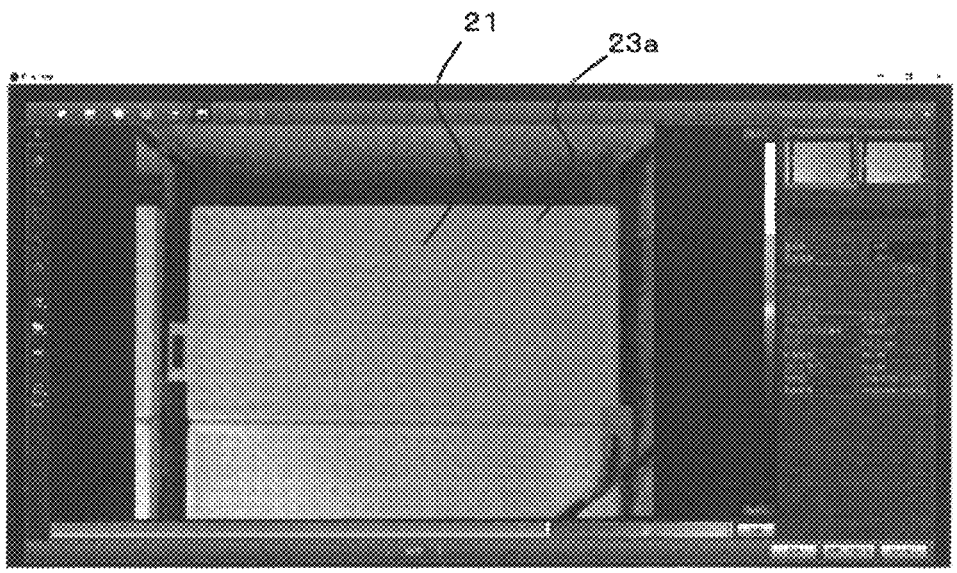
FIG. 5 illustrates measurement of the surface temperature of the sowing mat and digitization thereof.
Figure 5:
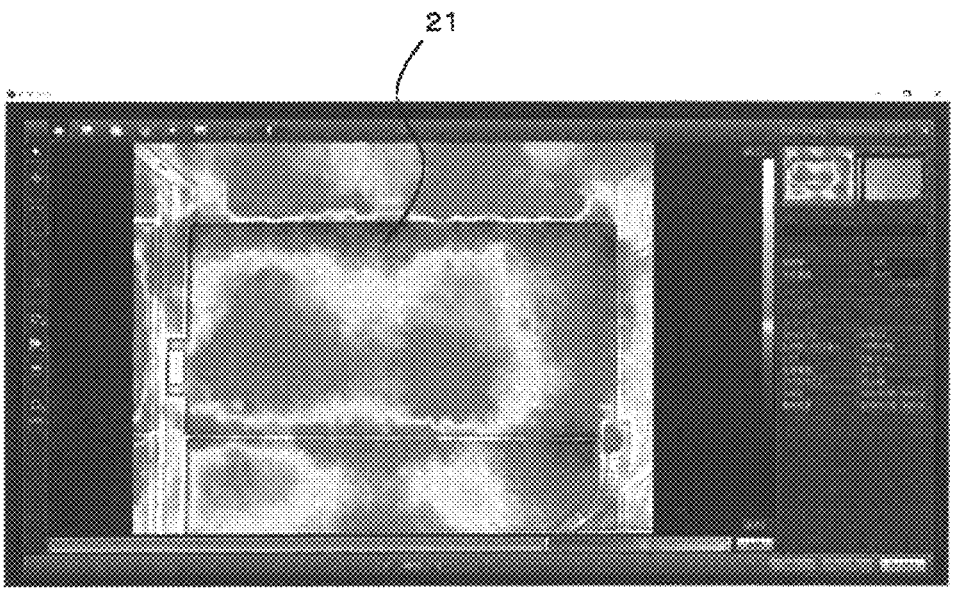
Figure 6:
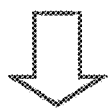
FIG. 6 illustrates measurement of the surface temperature of the sowing mat and digitization thereof.

FIG. 5 and FIG. 6 illustrate the measurement and the digitization of the surface temperature of the sowing mat (medium). FIG. 5 (a) is an image of the surface of sowing mat 21 in the germination section, which is captured by RGB camera 24 from the upper part (camera-side). FIG. 5 (b) is an image of the distribution of the surface temperature of sowing mat 21, which is similarly captured by IR camera 25. The dark part in FIG. 5 (b) is a deep red part in the color image. The deep red part shows the high temperature part of the surface of sowing mat 21.

The infrared image (thermography) captured by IR camera 25 is recorded as image information 2a in data storage 3. In addition, the infrared image is analyzed in image processing part 5 and all digitized. The information obtained by digitalization is also stored in data storage 3.

For example, the commercially available software for the analysis of the thermal image can be used for analyzing image information 2a captured by IR camera 25. In the Example, FLIR Tools (manufactured by FLIR Systems Japan K.K.) was used.

The results analyzed are stored in data storage 3 and recorded in the database.

FIG. 6 (a) is a part of the data information obtained by analyzing image information 2a captured by IR camera 25 with the software for analysis of the thermal image and exporting into a file having the CSV file format.

FIG. 6 (b) is the data information obtained by outputting image information 2a stored in data storage 3 into a worksheet of table calculation software and visualizing as the temperature data. On the worksheet, the temperature data in the location of seeds 23a on sowing mat 21 having 300 seed holes 23 are shown and the magnitude of the numeric values is expressed by the chromaticity of the cell. The information of the data obtained by analyzing image information 2a is processed to visualize so that the distribution of the temperature is confirmed by visual observation.

In this manner, image information 2a of the surface of sowing mat 21 captured by RGB camera 24 in FIG. 5 (a) is analyzed into the analog infrared image (thermography) captured by IR camera 25 in FIG. 5 (b) and quantified as the temperature data shown in FIG. 6 (a) to provide the distribution of the temperature according to the magnitude of the numeric value shown in FIG. 6 (b) so as to obtain the two-dimensional distribution of the plant traits.

In the relation of the two-dimensional distribution of the plant traits and the environmental factors obtained from the other factor information, physiological performance reactions information, genetic characteristic information, etc., for example, the association and causal relation of the location recorded as the location in which the numeric value in the distribution of the temperature is large, namely temperature is high with the state of the germination of each individual seed can be derived. The preferable temperature obtained from the association and causal relation is evaluated as favorable conditions for the high germination rate or one factor in reducing the dispersion, etc.

Figure 7:
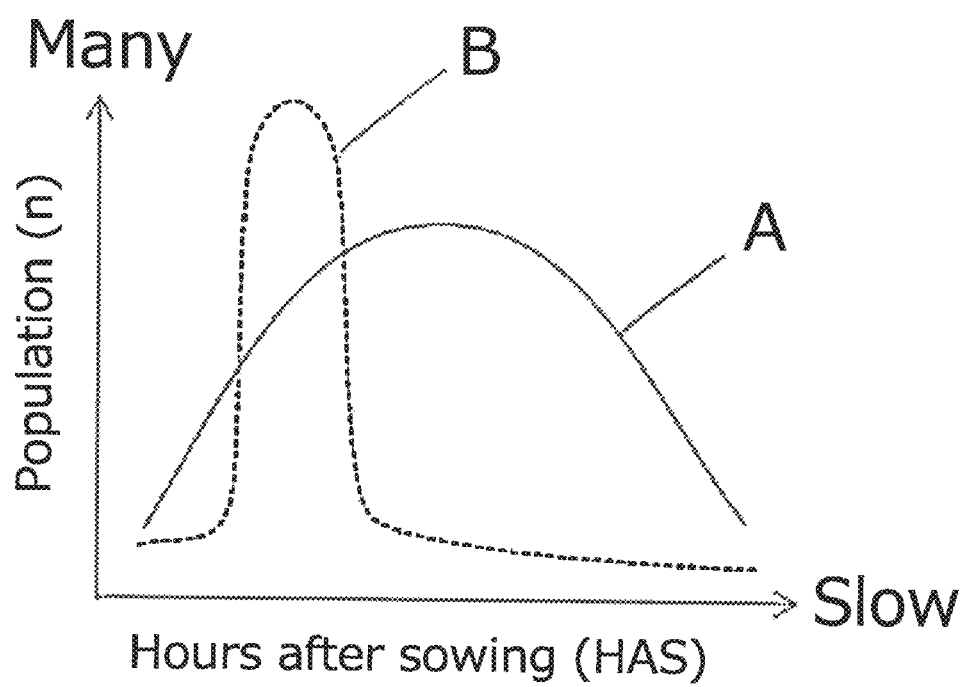
FIG. 7 shows the normal distributions showing the dispersion of the time from the sowing to the germination under the conventional technique and the preferable dispersion reduced by the system.

FIG. 7 shows the frequency distribution of the time from the sowing to the germination. As shown as (A) in FIG. 7 under the conventional technique, the dispersion of the time from the sowing to the germination is large, which results in the variation of the yields and the quality of the harvest. When the elapsed time from the sowing to the germination is shorten and the dispersion is minimized as shown as (B) in FIG. 7, it enables to shorten the germination period itself, to reduce the running costs, improve the stability of the yields and the quality and enhance the rate of harvest which can be commercially sold.

Example 1

In the above explanation, the two-dimensional distribution of the plant traits is obtained by digitizing the surface temperature of the sowing mat (medium) which is the environmental factor. In this manner, the kind of the seed, the nutrient solution percentage, the temperature inside the germination section, etc., in addition to the sowing mat are changed and then the characteristic data of the individuals of plant canopy is collected by continuously measuring and tracking under the various conditions to obtain the association and the causal relation.

Figure 8:
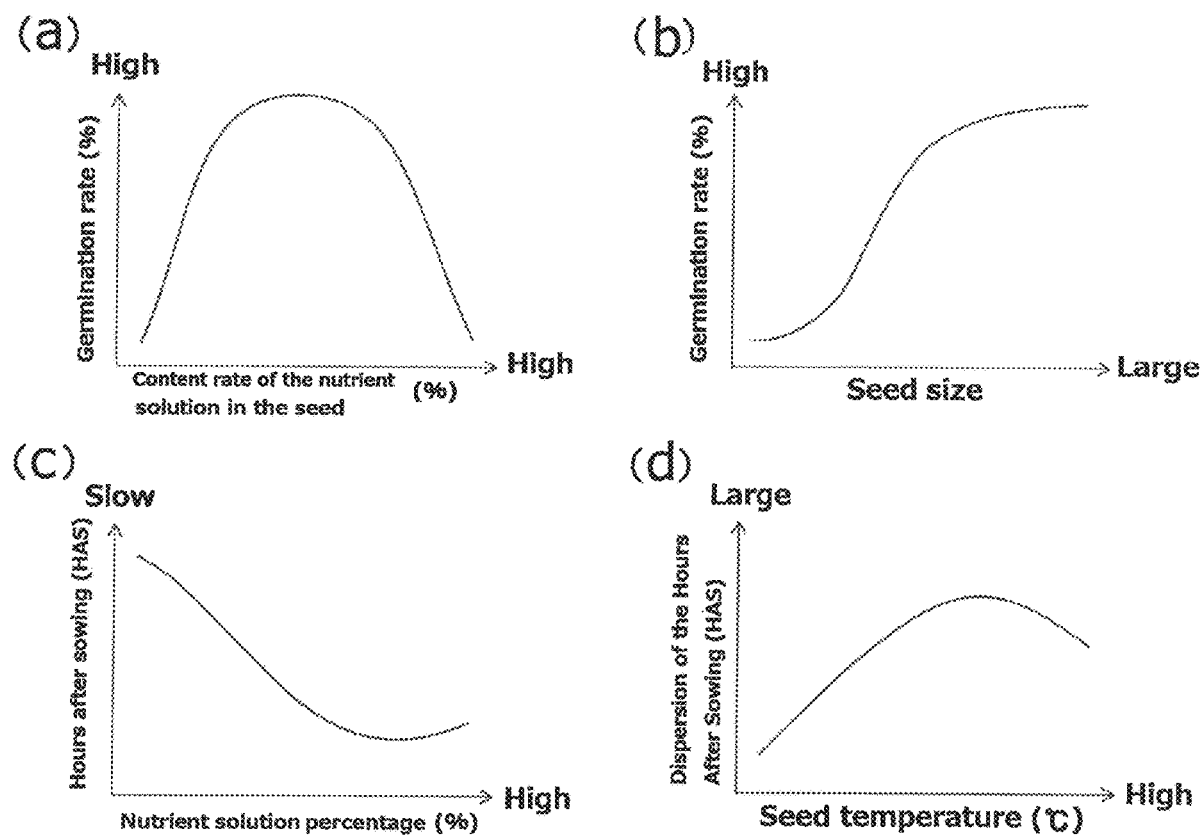
FIG. 8 shows reference examples of the results derived from the data obtained by the system.

FIG. 8 are the diagrams showing (a) the relation of the water content of the seed with the germination rate, (b) the relation of the size of the seed with the germination rate, (c) the relation of the nutrient solution percentage with the elapsed time from the sowing to the germination (HAS: Hours After Sowing), and (d) the relation of the temperature of the seed with the dispersion of the time from the sowing to the germination (HAS). Water, temperature, and oxygen are necessary for the germination, but the high germination rate is not stably obtained, when these values are too large or too small. As shown in the (a), water shortage or the lack of oxygen caused by the excess of water lowers the germination rate. As shown in (b), it tends to be difficult for the small seed or the depauperate seed, etc. to germinate. In (c), when the nutrient solution percentage is too low, the time required for the nutrient solution percentage around the seed to achieve the nutrient solution percentage required for germination, namely the Hours After Sowing, depends on the power with which the surface of the solution is raised from the bottom of the medium by the capillary action and is slow. But when the nutrient solution percentage is too high, the seeds are soaked in the nutrient solution, which provides the lack of the oxygen. The relation is entirely different depending on the density or the material of the medium. In (d), when the seeds are exposed to the constant low temperature, the germinating power may be induced and the timing of the germination may tend to be uniform, but which depends on the kinds of the plant.

The above results are different depending on the kinds of the seeds.

There are coated seeds and uncoated seeds. In the selecting and breeding process at the seed or seedlings production company, etc., the uncoated seeds are used. Note that the producers mostly use the coated seeds because of the ease of the sowing. There are the granulated-coated seeds which have a uniform shape and a uniform size by coating the surface of seeds with inorganic powder for seeding ease and the film-coated seeds which is made by coating the surface of the seeds with a resin including an agrochemical such as a germicide and a pesticide, etc. The coated seeds having a uniformly spherical shape by coating the seeds with the powder mainly made of the natural cray mineral are often used for cultivating lettuce.

From the above, the general analysis using the various pattern of data about the cultivation may be necessary to improve the germination rate and reduce the dispersion of the time from the sowing to the germination.

Figure 9:
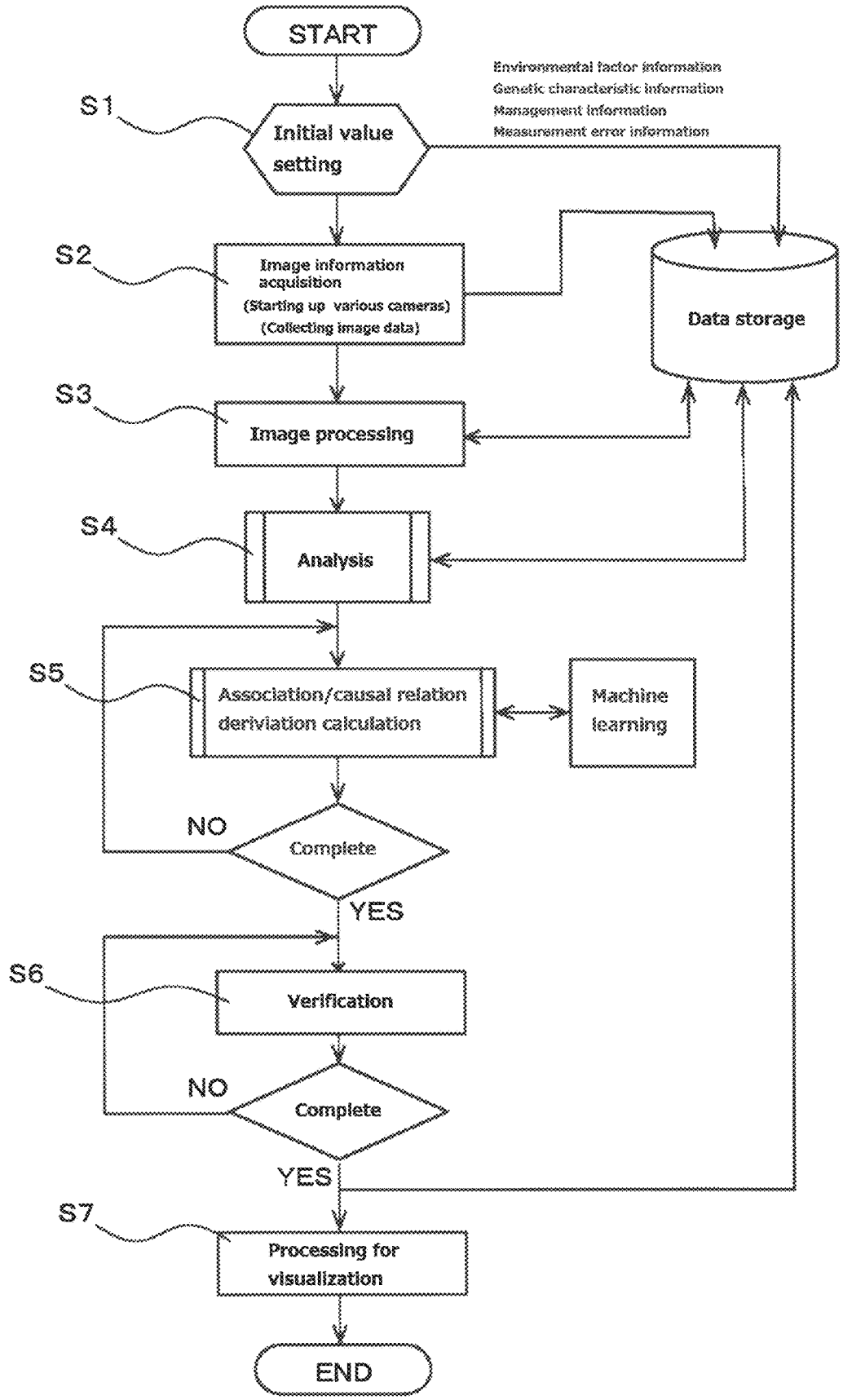
FIG. 9 shows a processing flow of one example of the seed cohort phenotyping system for the plant factory with artificial lighting of the invention

FIG. 9 shows a processing flow of one example in the seed cohort phenotyping system for the plant factory with artificial lighting of the invention.

First, as the initial value setting, environmental factor information 2b, genetic characteristic information 2c, management information 2d and measurement error 2e, etc., are inputted from data set input part 2 to store in data storage 3 (Step 1, hereinafter referred to as "S1").

Next, the RGB image information acquisition means (RGB camera 24) and the IR image information acquisition means (IR camera 25) are started up. The data of the morphology, the size and the color of the seeds, the morphology, the size and the color of the seedling, the temperature of the seeds, the timing of the germination (the time from the sowing to the germination), the surface temperature of the medium, the elongating rate of radicles, the image data and the like in the growth process during the germination period are continuously collected, captured as image information 2a and stored in data storage 3 (Step 2).

After that, image information 2a stored in data storage 3 is processed (Step 3) based on the control instructions from operation and control part 1 in image processing part 5 and analyzed in statistical data analyzing part 6. The analyzed information is stored in data storage 3 (Step 4).

Besides, the water or nutrient solution uptake rate when the seeds absorb the water or the nutrient solution to be swollen and start to grow from the dormant state, the water content to the size of the seeds (the content rate of the water in the seed), and the oxygen concentration necessary for the germination in the growth process during the germination period are continuously measured by various sensors 26 as the physiological performance reactions and each measurement information is stored in data storage 3, which is not shown in FIG. 9.

In the same way, the temperature, the vapor pressure deficit, the nutrient solution percentage, the nutrient solution temperature, the pH and the electric conductivity, etc., in the growth process of the germination period are continuously measured as the environmental factor information and each measurement information is stored in data storage 3.

In this way, the various information stored in data storage 3 and collected continuously is analyzed on the control instructions from operation and control part 1 as the plant trait information.

After analyzing each information, the contribution to the two-dimensional distribution of the plant traits is calculated by using machine learning part (deep learning part) 4 in association/causal relation derivation calculation part 7 in order to derive the association or the causal relation of the information with each other (Step 5).

When the derivation calculation of the association/causal relation is completed, each information is verified in verification part 8 (Step 6). Note that when the derivation calculation of the association/causal relation is not completed, the calculation is performed again in association/causal relation derivation calculation part 7.

After the verification of each information is completed, the results are processed to visualize in visualization part 9 (Step 7). When the verification is not completed, the verification processing is performed again. In this way, based on the various information stored in data storage 3. the two-dimensional distribution of the various plant traits of the object plant is derived. The plant traits of the individuals of plant canopy in the growth process during the germination period is tracked to derive and automatically evaluate the association and the causal relation of each information.

In the seed cohort phenotyping system of the invention described in Example above, only the small size cameras and sensors are used, therefore the configuration is simple. Because of non-destructive system, the phenotyping is performed without causing any harm to the shipment step. Thus, the cost is low.

The enormous amount of data generated is transferred to a cloud computer online, which is obtainable, therefore no special device is required.

In the plant factory with artificial lighting, all environmental factors affecting the growth of the plant can be controlled. The optimum set values to achieve the germination rate of 99.9% or more, the coincident germination and uniform growth after the germination are derived with deep learning method, etc., by using the big data about the environment and the plant traits accumulated every day.

By using the seed cohort phenotyping system aforementioned the behavior of the seed can be evaluated under the uniform environment during the germination period when the enormous labor and time are required for the seeds especially picked for the purpose of the selecting and breeding. The labor and time required for phenotyping are reduced to about one-tenth or less compared to the conventional amount, therefore the phenotyping can be performed with high efficiency of several hundred or more times.

In addition, the germination rate close to 100% is important to improve the utilization efficiency of the input energy and the cultivation area at the plant factory with artificial lighting, and may be more important for the automation required especially at the large-scale plant factory (the production is 5000 plants per day) in the future. By using the system, the germination rate of 99.9% or more and the production of the uniform seedlings can be achieved. The lowering of the production efficiency due to no germinated seed and the wide dispersion of the growth in the selecting and cultivating operation can be avoided at the large-scale plant factory and the seedling company. In addition, the automation required at the large-scale plant factory can be promoted.

Namely, the effective utilization of the limited cultivation space, the production of the uniform seedling and the improvement of the operation efficiency are demanded at the plant factory for the mass-production. The improvement of the germination rate and the establishment of the uniformity of the seedlings can contribute a great deal to increase efficiency in the steps after the seedling and the improvement of the productivity.

The use of the seed cohort phenotyping system of the invention is not limited to the large-scale commercial plant factory. The seed cohort phenotyping system of the invention can be used for the small- and medium-scale commercial plant factory, small- and very small-scale plant factory (plant module) for the education, the self-education, the hobby and the like and furthermore for the production of the high quality and uniform seedling in a general farm.

DESCRIPTION OF CODE

1 Operation and control part
2 Data set input part
2a Image information
2b Environmental factor information
2c Genetic characteristic information
2d Management information
2e Measurement error information
3 Data storage
4 Machine learning part
5 Image processing part
6 Statistical data analyzing part
7 Association/causal relation derivation calculation part
8 Verification part
9 Visualization part
10 Others
20 Housing of the germination section
21 Sowing mat
22 Sowing box filled with the nutrient solution
23 Seed hole
23a Seed
24 RGB camera
25 IR camera
26 Sensor
27 Artificial light modules (LED panel)
30 Integrated control part

The invention claimed is:

1. A seed cohort phenotyping system for a plant factory with artificial lighting, comprising an integrated control part comprising an operation and control part, a data set input part, a data storage, a machine learning part, an image processing part, a statistical data analyzing part, an association/causal relation derivation calculation part and a verification part, wherein the integrated control part provides a two-dimensional distribution of plant traits by non-destructively and continuously measuring plant trait information in a growth process during a germination period, on a basis of image information, environmental factor information, genetic characteristic information and management information inputted from the data set input part and stored in the data storage, wherein physiological performance reactions of seeds sowed in an environmentally-controlled closed space during the germination period are continuously measured, and wherein a two-dimensional distribution of the environmental factor information, a nutrient solution temperature, a temperature, a vapor pressure deficit, a nutrient solution percentage, a pH and an electric conductivity are continuously measured to reduce labor and working time for automation of production at a plant factory and automation of seed selecting and cultivating operation in a seedling production at the plant factory, improve a germination and produce uniform seedlings.

2. The seed cohort phenotyping system for a plant factory with artificial lighting according to claim 1, wherein the two-dimensional distribution is provided by incorporating a morphology, a size, color, temperature of seeds, a timing of germination, a surface temperature of a medium, and an elongating rate of radicles as image information with an RGB image information acquisition means and an IR image information acquisition means.

3. The seed cohort phenotyping system for a plant factory with artificial lighting according to claim 1, wherein the physiological performance reactions comprise a water or nutrient solution uptake rate when the seeds start to grow on growing point from dormant in a state that the seeds are swollen, a nutrient solution content to the size of the seeds and an oxygen concentration necessary for the germination.

4. The seed cohort phenotyping system for a plant factory with artificial lighting according to claim 1, wherein the environmental factor information comprises a temperature, a vapor pressure deficit, a nutrient solution percentage, a nutrient solution temperature, a pH, and an electric conductivity.

5. The seed cohort phenotyping system for a plant factory with artificial lighting according to claim 1, wherein the genetic characteristic information comprises homology information between genome information obtained from genome DNA and RNA extracted from grown plant by various genetic engineering experiments and genome information obtained from known genome information database.

6. The seed cohort phenotyping system for a plant factory with artificial lighting according to claim 1, wherein the management information comprises a sower, a time required for sowing, locations of seeds in a sowing box in a germination section, and a measurement error.

7. The seed cohort phenotyping system for a plant factory with artificial lighting according to claim 1, wherein the germination rate is 99.9% or more.

* * * * *